(12) United States Patent
Reed

(10) Patent No.: US 9,083,864 B2
(45) Date of Patent: Jul. 14, 2015

(54) SELF-CLEANING CAMERA LENS

(71) Applicant: Ford Global Technologies, LLC, Dearborn, MI (US)

(72) Inventor: Glenn Richard Reed, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/955,115

(22) Filed: Jul. 31, 2013

(65) Prior Publication Data

US 2015/0036037 A1    Feb. 5, 2015

(51) Int. Cl.
*G03B 17/00*   (2006.01)
*H04N 5/217*   (2011.01)

(52) U.S. Cl.
CPC .................................. *H04N 5/2171* (2013.01)

(58) Field of Classification Search
USPC ............................................ 396/55, 439, 661
See application file for complete search history.

(56) References Cited

U.S. PATENT DOCUMENTS

| | | | |
|---|---|---|---|
| 5,708,859 A | 1/1998 | Tjima et al. | |
| 5,886,455 A | 3/1999 | Tsukimoto | |
| 6,793,416 B2 * | 9/2004 | Peterson et al. | 396/427 |
| 7,810,511 B2 * | 10/2010 | Fagrenius et al. | 134/44 |
| 8,075,143 B2 * | 12/2011 | Fujimoto | 359/507 |
| 8,247,248 B2 * | 8/2012 | Ling | 438/27 |
| 8,425,058 B2 | 4/2013 | Nomura | |
| 8,485,741 B1 * | 7/2013 | Bunn et al. | 396/439 |
| 8,805,550 B2 * | 8/2014 | Chemel et al. | 700/22 |
| 2008/0112050 A1 | 5/2008 | Nomura | |
| 2008/0285132 A1 | 11/2008 | O'Kane | |
| 2009/0204291 A1 | 8/2009 | Cernosov | |
| 2011/0076478 A1 | 3/2011 | Haynes et al. | |
| 2012/0243093 A1 * | 9/2012 | Tonar et al. | 359/507 |
| 2013/0094086 A1 | 4/2013 | Bochenek | |
| 2013/0129279 A1 * | 5/2013 | Hodge | 385/30 |
| 2014/0010408 A1 * | 1/2014 | Irie et al. | 382/103 |

FOREIGN PATENT DOCUMENTS

| | | |
|---|---|---|
| EP | 0700103 | 3/1996 |
| GB | 2332756 | 6/1999 |
| JP | 2009199025 | 9/2009 |
| JP | 2009265473 | 11/2009 |

OTHER PUBLICATIONS

Machine translation of JP 2000-081502A—Imamura.*

* cited by examiner

*Primary Examiner* — Rodney Fuller
*Assistant Examiner* — Linda B Smith
(74) *Attorney, Agent, or Firm* — Frank MacKenzie; Bejin Bieneman PLC

(57) ABSTRACT

A camera system includes a lens that directs light onto an image sensor, an actuator that vibrates the lens, and a charge generator that charges a surface of the lens. The camera system further includes a controller that can determine a change in transparency of the lens and selectively activate the actuator based at least in part on the change in transparency. A method includes electrically charging a surface of a camera lens, determining a change in transparency of the camera lens, comparing the change in transparency to a predetermined threshold, and selectively activating an actuator to vibrate the camera lens if the change in transparency is above a predetermined threshold.

18 Claims, 3 Drawing Sheets

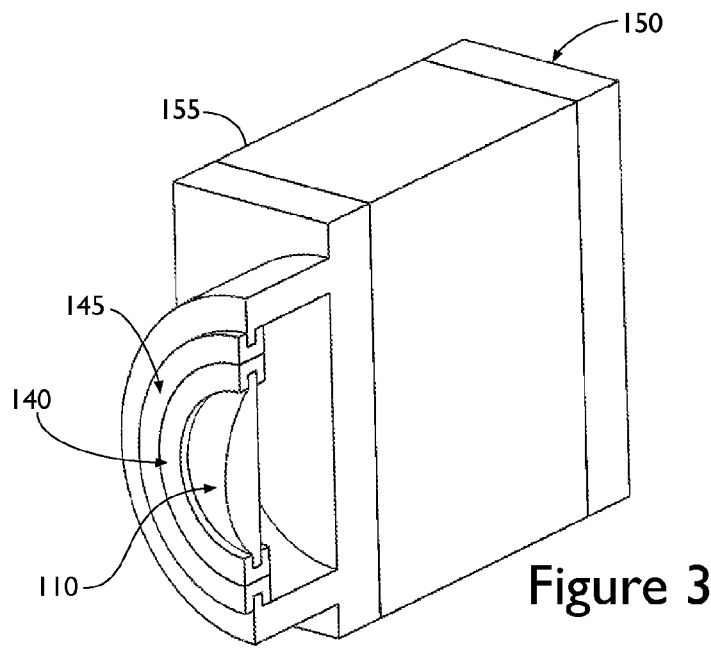
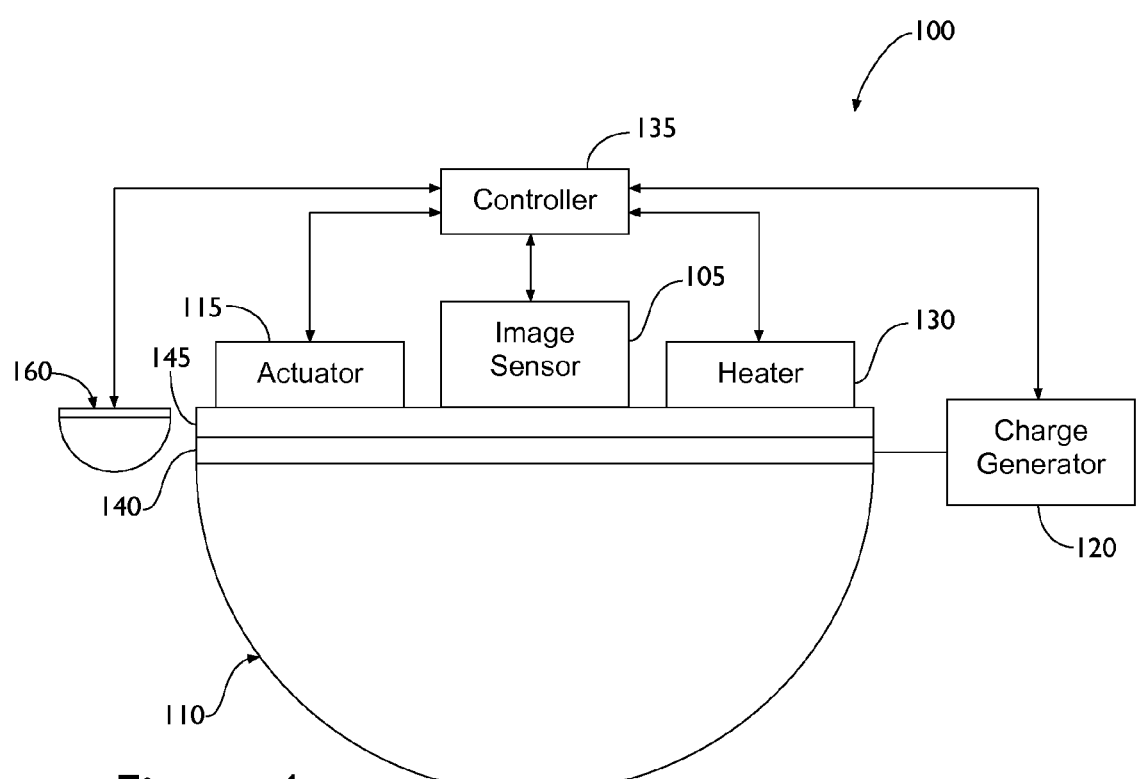

though cameras or other devices, such as certain types of cameras or electronics that may be included in a vehicle; it may be desirable for the camera and lens to be self-cleaning.

SELF-CLEANING CAMERA LENS

BACKGROUND

Camera technology is implemented in many different environments. Cameras intended for outdoor use, such as those exterior to a vehicle or building, may be exposed to the elements, dust, mineral deposits, or the like. Such exposure may cause a buildup of residue that reduces the quality of the images captured by the camera. Camera lenses are often cleaned by wiping or washing residue from the lens. More sophisticated techniques are used to remove debris from the inside of the camera lens.

BRIEF DESCRIPTION OF THE DRAWINGS

FIG. 3 is a cross-sectional view of the camera of FIG. 2.

FIG. 4 is a block diagram of another exemplary camera system with a self-cleaning lens.

DETAILED DESCRIPTION

An exemplary self-cleaning camera system includes a lens that directs light onto an image sensor, an actuator that vibrates the lens, and a charge generator that charges a surface of the lens. The camera system further includes a controller that can determine a change in transparency of the lens and selectively activate the actuator based at least in part on the change in transparency. A method includes electrically charging a surface of a camera lens, determining a change in transparency of the camera lens, comparing the change in transparency to a predetermined threshold, and selectively activating an actuator to vibrate the camera lens if the change in transparency is above a predetermined threshold.

The self-cleaning camera system can be used in many different environments, including environments with frequent exposure to the elements, dust, mineral deposits, or the like. For instance, the camera system can be used with commercial or passenger vehicles or in other implementations where contact with the elements, dust, mineral deposits, etc., are frequent or unavoidable. Examples of other possible implementations may include outdoor or indoor security cameras, handheld cameras (i.e., "point and shoot" cameras, single lens reflective (SLR) cameras, video cameras, etc.), projectors, web cameras, vehicle glass, computer screens, televisions, mobile devices including mobile phones and tablet computers, or any other device where light is expected to pass through a generally transparent medium.

Figure 1:
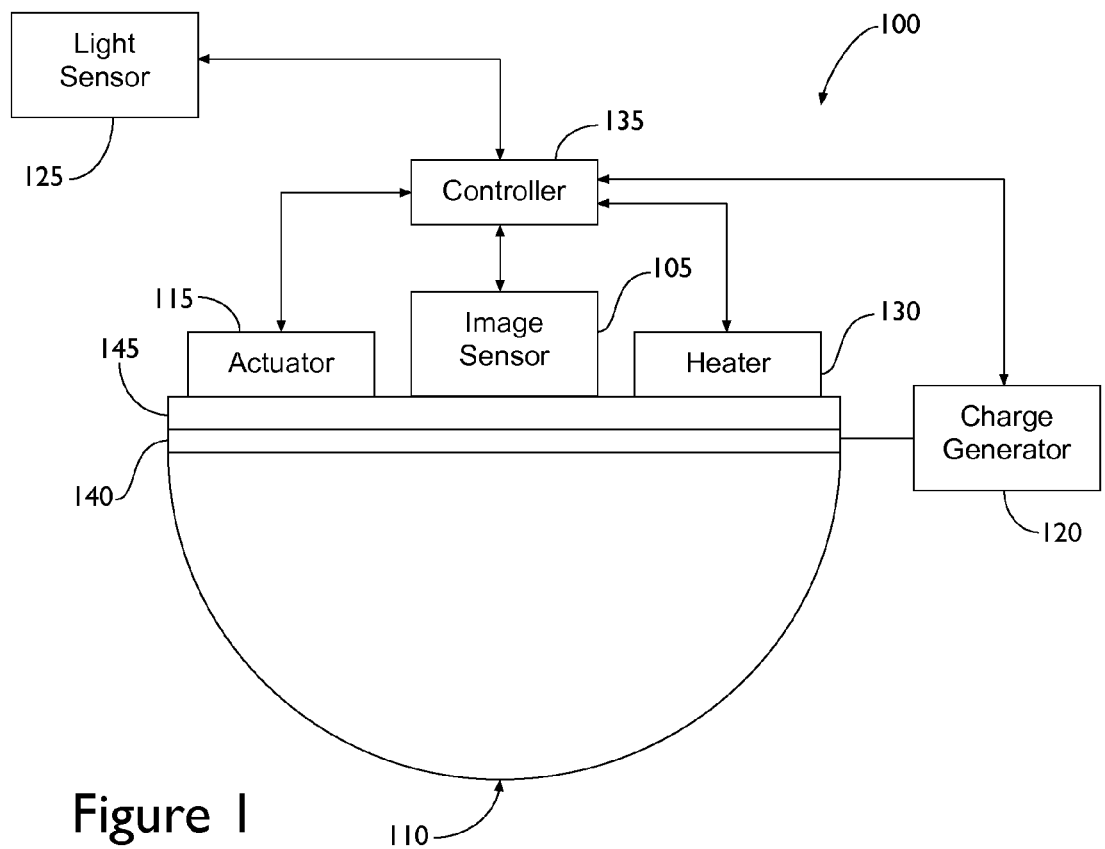
FIG. 1 is a block diagram of one exemplary camera system with a self-cleaning lens.

FIG. 1 illustrates an exemplary camera system having a self-cleaning lens. The system may take many different forms and include multiple and/or alternate components and facilities. While exemplary systems are shown, the exemplary components illustrated are not intended to be limiting. Indeed, additional or alternative components and/or implementations may be used.

As illustrated in FIG. 1, the camera system 100 includes an image sensor 105, a camera lens 110, an actuator 115, a charge generator 120, a light sensor 125, a heater 130, and a controller 135.

The image sensor 105 may be configured to capture an optical image, convert the optical image to a digital signal, and output the digital signal. In one possible approach, the image sensor 105 may include a charge-coupled device (CCD) or a complementary metal-oxide-semiconductor (CMOS) active pixel sensor. The image sensor 105 may implement a color filter array where each filter passes red, green, or blue light. Alternatively, the image sensor 105 may use an array of layered pixel sensors to separate colors from captured light. In some possible implementations, the image sensor 105 may be configured to measure an amount of light that passes through the camera lens 110. The image sensor 105 may be further configured to output a signal representing the amount of light that passes through the camera lens 110.

The camera lens 110 may be configured to direct light onto the image sensor 105. The camera lens 110 may be formed from any generally transparent material such as glass or a transparent plastic such as poly methyl methacrylate (PMMA), sometimes referred to as "acrylic glass." The camera lens 110 may have a rounded shape to direct light toward the image sensor 105. In some possible approaches, the camera lens 110 may be coated with a generally transparent hydrophobic coating to repel liquids such as water. Examples of hydrophobic coatings may include a manganese oxide polystyrene ($MnO_2$/PS) nanocomposite, a zinc oxide polystyrene (ZnO/PS) nanocomposite, precipitated calcium carbonate, a carbon nanotube structure, or a silica nano coating or another type of gel-based coating. The hydrophobic coating may be applied to the camera lens 110 by dipping the camera lens 110 into a fluid form of the hydrophobic material or by spraying the hydrophobic coating onto the camera lens 110. Other methods of applying the hydrophobic coating to the camera lens 110 may be used as well.

The actuator 115 may be configured to vibrate the camera lens 110. The actuator 115 may include a piezoelectric material that resonates when subject to a voltage potential. The actuator 115 may cause the camera lens 110 to vibrate at an intensity that is sufficient to shake debris from the camera lens 110. Examples of debris may include dust, dirt, mud, snow, mineral deposits, salt, water, or any other substance that may collect on the camera lens 110.

The charge generator 120 may be configured to generate a positive electric charge or a negative electric charge and apply the generated electric charge to the surface of the camera lens 110. In some implementations, the charge generator 120 may be used in accordance with an elastomeric connector having a conductive layer 140 stacked on a non-conductive layer 145. The conductive layer 140 may pass the electric charge to the surface of the camera lens 110. The charge generator 120 may be electrically connected to the conductive layer 140, and when the charge generator 120 is turned on, the surface of the camera lens 110 may exhibit a positive or negative electric charge that can be used to repel debris. By repelling the debris, the electric charge may prevent debris from accumulating on the camera lens 110.

The charge applied may be related to the target debris to repel. For instance, dust may generally exhibit a positive charge so applying a positive charge to the surface of the camera lens 110 may repel dust. When the camera system 100 is implemented in a vehicle, the charge generator 120 may continuously apply the electric charge to the surface of the camera lens 110 any time the vehicle is running. In some instances the charge generator 120 may be turned on as soon as the vehicle is turned on while in other instances the charge generator 120 may be selectively activated such as when a particular type of debris that can be repelled by an electric charge is detected or begins to accumulate on the camera lens 110.

The light sensor 125 may be configured to measure an amount of ambient light near the camera system 100, and in particular, near the camera lens 110. In some instances, the light sensor 125 may include a sun-load sensor mounted on, e.g., a vehicle dashboard. The amount of ambient light may be related to the amount of sunlight or light from artificial sources, such as indoor or external light fixtures, in the area near the camera lens 110. The light sensor 125 may be configured to generate and output a signal representing the amount of ambient light measured.

The heater 130 may be configured to generate a sufficient amount of heat to melt snow or ice from the camera lens 110 within a predetermined amount of time. The heater 130 may include a heating element, such as a resistive heating element, that is generates heat when provided with an electric signal. The heater 130 may be disposed on or near the camera lens 110 to heat the camera lens 110 through conduction, convection, radiation, or a combination of these heating processes.

The controller 135 may be configured to output signals that affect the operation of the image sensor 105, the actuator 115, the charge generator 120, and the heater 130. For instance, the controller 135 may be configured to generate signals that activate the image sensor 105, the actuator 115, the charge generator 120, the heater 130, or any combination of these devices. Furthermore, the controller 135 may be configured to generate control signals that control the operation of any one or more of these camera system 100 components. In some instances, the controller 135 may be configured to receive and process signals received from any one or more of these components of the camera system 100.

The controller 135 may include any number of processing devices configured to execute instructions that define the operation of the controller 135. For instance, the controller 135 may be configured to determine whether the camera lens 110 is dirty, and if so, selectively activate the actuator 115, the charge generator 120, the heater 130, or any combination of these components to clean the camera lens 110. In one possible implementation, the controller 135 may be configured to determine a change in transparency of the camera lens 110 and selectively activate the actuator 115 based at least in part on the change in transparency, typically when the camera lens 110 becomes less transparent.

To determine the change in transparency of the camera lens 110, the controller 135 may be configured to receive a signal output by the light sensor 125 representing the amount of ambient light in the environment surrounding the camera lens 110 and a signal from the image sensor 105 representing the amount of light that has passed through the camera lens 110. The controller 135 may be configured to compare the amount of ambient light measured by the light sensor 125 to the amount of light received by the image sensor 105 to determine the change in transparency of the camera lens 110. If the amount of ambient light is equal to the amount of light received by the image sensor 105, the controller 135 may be configured to determine that the camera lens 110 is completely transparent, meaning that no debris or residue has accumulated on the camera lens 110. If, however, the amount of light received by the image sensor 105 is less than the amount of ambient light, the controller 135 may be configured to determine that at least some debris has accumulated on the camera lens 110.

When determining the change in transparency of the camera lens 110, the controller 135 may be configured to allow for some difference between the amount of ambient light and the amount of light received by the image sensor 105 to eliminate factors such as noise or imperfections of the materials used to form the camera lens 110 from skewing the determination by the controller 135 concerning transparency. The controller 135, therefore, may be configured to determine that a difference of, e.g., 10% or greater may indicate a concerning amount of accumulation of debris on the camera lens 110 while a difference of, e.g., less than 10% may indicate a sufficiently clean camera lens 110. Accordingly, the controller 135 may be configured to compare the difference to a predetermined threshold (e.g., 10%) and determine whether the transparency of the camera lens 110 has been compromised based on the difference relative to the predetermined threshold.

When the amount of light that reaches the image sensor 105 is less than the amount of ambient light, or when the difference meets or exceeds the predetermined threshold, the controller 135 may be configured to activate the actuator 115 to vibrate the camera lens 110 and dislodge at least some of the debris that has accumulated on the camera lens 110. The controller 135 may be configured to disable the actuator 115 after a predetermined amount of time or when the difference between the amount of light that reaches the image sensor 105 is approximately equal to or within the predetermined threshold relative to the amount of ambient light measured. In some instances, the controller 135 may activate the actuator 115 until the amount of light reaching the image sensor 105 is greater than at the time the actuator 115 was activated. Continuing with the previous example, the controller 135 may activate the actuator 115 when the difference is at or below, e.g., 10% but disable the actuator 115 when the difference is at or above, e.g., 5%. Although 10% is used as an example of a threshold, other values may be more appropriate. For instance, increasing the threshold to, e.g., 50% may cause the controller 135 to activate the actuator 115 less often than if the predetermined threshold were set at 10%. Another consideration is image quality. Lowering the predetermined threshold (e.g., from 10% to 50%) may be appropriate in instances where image quality is less important or where the amount of transparency at 50% does not significantly impact the operation of the camera system 100 or a driver's user of the camera system 100.

Figure 2:
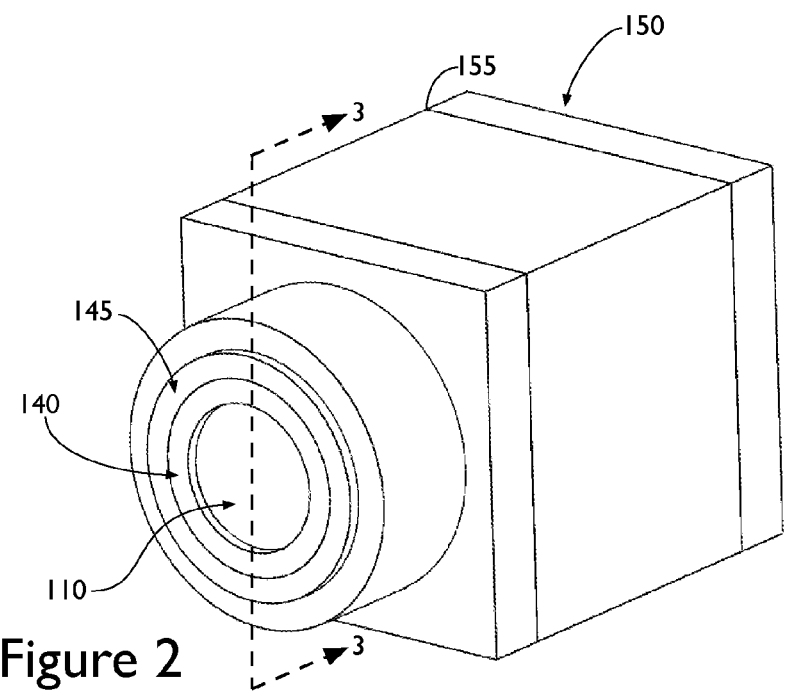
FIG. 2 is a perspective view of a camera that may be used with the camera system shown in FIG. 1.

FIG. 2 is a perspective view of an exemplary camera 150 that may be used with the camera system 100 shown in FIG. 1. As illustrated, the camera 150 includes a housing 155 for supporting the image sensor 105 and the camera lens 110. The conductive layer 140 is disposed on the camera lens 110, and the non-conductive layer 145 is disposed on the conductive layer 140. As discussed above, the conductive layer 140 is electrically connected to the charge generator 120. The motion of the actuator 115 may be applied directly to the camera lens 110 or to the non-conducting layer or the housing 155 to indirectly vibrate the camera lens 110. FIG. 3 is a cross-sectional view of the exemplary camera 150 of FIG. 2 taken along the line 3-3 of FIG. 2. Specifically, the camera 150 shown in FIG. 3 shows an example of the relationship between the conductive layer 140 and the non-conductive layer 145 relative to the camera lens 110.

FIG. 4 illustrates components of another example camera system 100 with a self-cleaning lens. As illustrated, the camera system 100 includes a light emitting diode 160 instead of the light sensor 125 discussed above, although a camera system 100 may include both the light sensor 125 and the light emitting diode 160. In this example approach, the controller 135 may be configured to determine how much light generated by the light emitting diode 160 has been reflected back from the lens of the light emitting diode 160. The controller 135 may be configured to assume that such reflection may be caused by debris that has accumulated on the lens of the light emitting diode 160, and that the same amount of debris may have accumulated on the camera lens 110. Thus, the controller 135 may be configured to estimate the change in transparency of the camera lens 110 from the amount of light reflected by the lens of the light emitting diode 160. Based on this transparency estimate, the controller 135 may be configured to activate the actuator 115 to vibrate both the camera lens 110 and the lens of the light emitting diode 160 to remove debris. In some possible approaches, the lens of the light emitting diode 160 may also be coated with a hydrophobic coating, and the charge generator 120 may apply the same electric charge to a surface of the lens of the light emitting diode 160.

Figure 5:
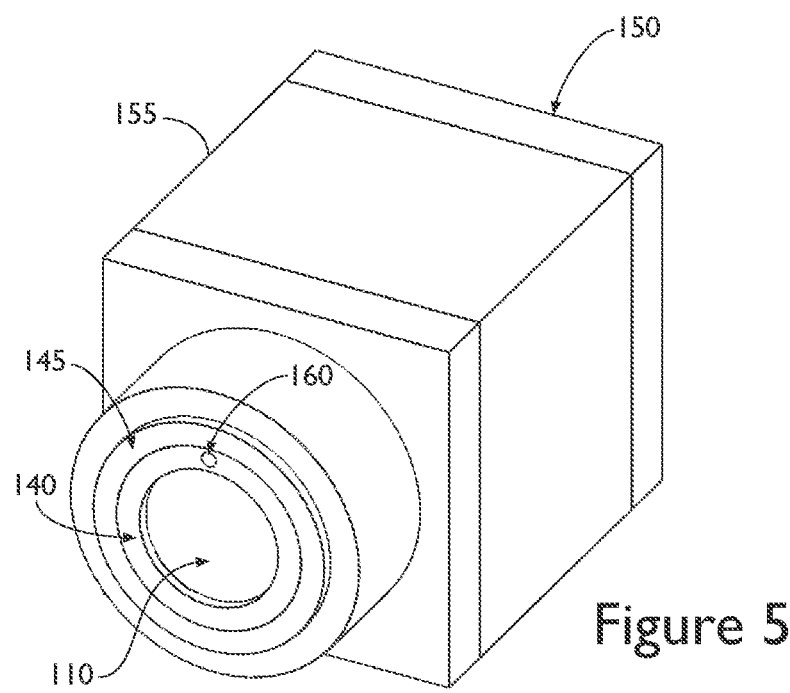
FIG. 5 is a perspective view of a camera that may be used with the camera system shown in FIG. 4.

FIG. 5 is a perspective view of an exemplary camera 150 that may be used with the camera system 100 shown in FIG. 4. The light emitting diode 160 shown in FIG. 5 is located near the camera lens 110 so that the amount of debris that accumulates on the light emitting diode 160 may be similar to the amount of debris that accumulates on the camera lens 110. Also, placing the light emitting diode 160 near the camera lens 110 allows for a single charge generator 120 and a single actuator 115 to operate on both the light emitting diode 160 and the camera lens 110.

In general, computing systems and/or devices, such the controller 135, may employ any of a number of computer operating systems, including, but by no means limited to, versions and/or varieties of the SYNC® operating system by Ford Motor Company of Dearborn, Mich., the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices generally include computer-executable instructions, where the instructions may be executable by one or more computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The controller 135 may be configured to access one or more databases, data repositories, or other data stores that may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and may be accessed directly or via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices stored on computer readable media associated therewith (e.g., disks, memories, etc.). A computer program product may comprise such instructions stored on computer readable media for carrying out the functions described herein.

Figure 6:
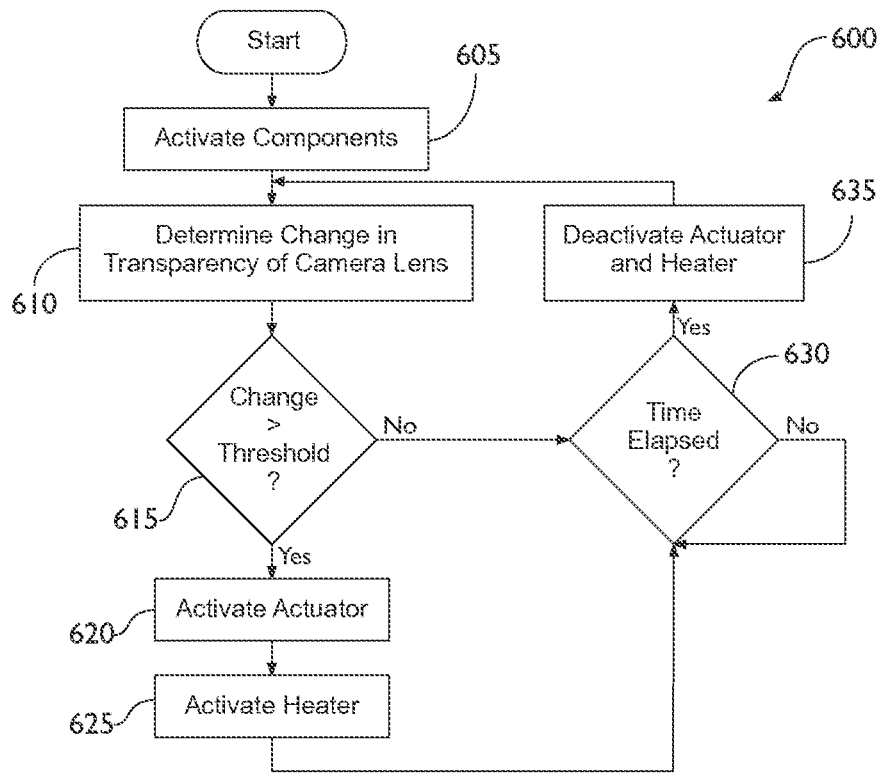
FIG. 6 is a flowchart of an exemplary process that may be implemented by the camera system.

FIG. 6 is a flowchart of an exemplary process 600 that may be implemented by the camera system 100. For instance, the process 600 shown in FIG. 6 may represent operations carried out by the controller 135. When the camera system 100 is used with a vehicle, the process 600 may begin when the vehicle is turned on and execute continuously until the vehicle is turned off.

At block 605, the controller 135 may activate one or more components in the camera system 100. For instance, the controller 135 may activate the image sensor 105 and the charge generator 120. Activating the charge generator 120 may cause the surface of the camera lens 110 to become, e.g., positively charged. Moreover, the controller 135 may activate either the light sensor 125 or the light emitting diode 160 depending on the manner in which the controller 135 will determine the change in transparency of the camera lens 110, as discussed above. In some instances, the controller 135 may selectively activate the charge generator 120 to remove charged particles, such as dust, from the camera lens 110 after such particles have accumulated. Alternatively, the charge generator 120 may be activated during the entire process 600 to prevent accumulation of charged particles on the surface of the camera lens 110. When activated, the charge generator 120 may electrically charge the surface of the camera lens 110, as described in greater detail above.

At block 610, the controller 135 may determine the change in transparency of the camera lens 110. In one possible implementation, the controller 135 may determine the change in transparency of the camera lens 110 from measurements of the ambient light in the environment of the camera lens 110 taken by the light sensor 125. The controller 135 may compare the amount of light that has passed through the camera lens 110 to the amount of ambient light measured by the light sensor 125. The controller 135 may determine the change in transparency of the camera lens 110 based on the difference between the amount of light that has passed through the camera lens 110 and the amount of ambient light. The controller 135 may determine how much light passed through the camera lens 110 based from signals generated by the image sensor 105. In another possible implementation, the controller 135 may determine the change in transparency of the camera lens 110 based on an amount of light reflected by the lens of the light emitting diode 160.

At decision block 615, the controller 135 may determine whether the change in transparency, e.g., the difference between the amount of light received by the image sensor 105 and the amount of ambient light, exceeds a predetermined threshold. If the change in transparency exceeds the predetermined threshold, the process 600 may continue at block 620. If the change in transparency does not exceed the predetermined threshold, the process 600 may continue at block 630.

At block 620, the controller 135 may activate the actuator 115. Turning on the actuator 115 may cause the camera lens 110 to vibrate. The vibration of the camera lens 110 may shake certain debris off the camera lens 110 and may vibrate some debris at a resonance frequency that may break up the debris and thus cause the debris to fall off the surface of the camera lens 110. Accordingly, the actuator 115 may be selectively activated since constantly vibrating the camera lens 110 may reduce the quality of the images captured by the image sensor 105.

At block 625, the controller 135 may activate a heater 130 to heat a surface of the camera lens 110. The heater 130 may be activated any time the change in transparency is greater than the predetermined threshold determined at block 615, or in some instances, the heater 130 may be activated only if the debris collected on the camera lens 110 is determined to be ice, snow, or another substance that would release from the camera lens 110 when heated.

At decision block 630, the controller 135 may determine whether a predetermined amount of time has elapsed. If so, the process 600 may continue at block 635. If the predetermined amount of time has not elapsed, the process 600 may wait until the predetermined amount of time has elapsed by returning block 630. The predetermined amount of time may be based on the amount of time needed for the actuator 115, the heater 130, or both, to properly remove debris from the camera lens 110. In some instances, the predetermined amount of time may be based on a calibration value. Alternatively, the predetermined amount of time may be dynamically determined by the controller 135 based on, e.g., the type of debris that has collected on the camera lens 110. For instance, removing mud may require a longer period of vibration than removing dust. Also, the predetermined amount of time may be different for the heater 130 and the actuator 115. For instance, melting ice or snow from the camera lens 110 may generally take longer than vibrating dust from the camera lens 110. Therefore, the actuator 115 may be turned off before the heater 130.

At block 635, which may occur after the predetermined amount of time has elapsed at block 630, the controller 135 may turn off the actuator 115, the heater 130, or both. As discussed above, the controller 135 may turn off the actuator 115 and heater 130 after the same predetermined amount of time. In some instances, however, the controller 135 may turn off the actuator 115 and heater 130 after different predetermined amounts of time. The time at which the actuator 115 and heater 130 are turned off may be based on the type of debris that has collected on the camera lens 110.

The process 600 may continue to execute so long as the vehicle is running. In some possible implementations, the process 600 may be manually started by a user of the vehicle. Moreover, the user may disable automatic execution of the process 600 should the user so desire. Because the vibration caused by the actuator 115 may impact the quality of images captured by the image sensor 105 and because the actuator 115 may increase noise levels when activated, the controller 135 may provide the user of the vehicle with an indication that the camera system 100 is currently undergoing a cleaning operation.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A camera system comprising:
a lens configured to direct light onto an image sensor;
an actuator configured to vibrate the lens;
a charge generator configured to charge a surface of the lens with one of a positive charge and a negative charge to repel debris, wherein the charge generator includes an elastomeric connector having at least one conductive layer stacked on at least one non-conductive layer; and
a controller configured to determine a change in transparency of the lens and selectively activate the actuator based at least in part on the change in transparency.

2. The camera system of claim 1, further comprising a light sensor configured to measure an amount of ambient light.

3. The camera system of claim 1, wherein the controller is configured to determine the change in transparency of the lens by comparing an amount of ambient light measured by a light sensor to an amount of light that passes through the lens to the image sensor.

4. The camera system of claim 3, wherein the controller is configured to activate the actuator if the amount of light that passes through the lens is less than the amount of ambient light measured by the light sensor.

5. The camera system of claim 1, wherein the controller is configured to activate the actuator if an amount of light that passes through the lens is less than a predetermined threshold relative to an amount of ambient light measured by a light sensor.

6. The camera system of claim 1, further comprising a light emitting diode, and wherein the controller is configured to determine the change in transparency of the lens based at least in part on an amount of light reflected back to the light emitting diode.

7. The camera system of claim 1, wherein the lens is coated with a hydrophobic material.

8. The camera system of claim 1, further comprising a heater configured to heat a surface of the lens.

9. A method comprising:
electrically charging a surface of a camera lens to repel debris with a charge generator having an elastomeric connector having at least one conductive layer stacked on at least one non-conductive layer;
determining a change in transparency of the camera lens;
comparing the change in transparency to a predetermined threshold; and
selectively activating an actuator to vibrate the camera lens if the change in transparency is above a predetermined threshold.

10. The method of claim 9, wherein determining the change in transparency of the camera lens includes measuring an amount of ambient light with a light sensor.

11. The method of claim 9, wherein comparing the change in transparency to the predetermined threshold includes:
comparing an amount of ambient light measured by a light sensor to an amount of light that passes through the camera lens; and
determining whether a difference between the amount of ambient light and the amount of light that passes through the camera lens exceeds the predetermined threshold.

12. The method of claim 11, wherein selectively activating the actuator includes activating the actuator if the amount of light that passes through the camera lens is less than the amount of ambient light measured by the light sensor.

13. The method of claim 9, wherein selectively activating the actuator includes activating the actuator if an amount of light that passes through the camera lens is less than a predetermined threshold relative to an amount of ambient light measured by a light sensor.

14. The method of claim 9, wherein determining the change in transparency of the camera lens includes measuring an amount of light reflected back to a light emitting diode.

15. The method of claim 9, wherein electrically charging the surface of the camera lens includes generating a positive charge along the surface of the camera lens.

16. The method of claim 9, further comprising heating a surface of the camera lens.

17. A non-transitory computer-readable medium tangibly embodying computer-executable instructions that cause a processor to execute operations comprising:
generating a command to electrically charge a surface of a camera lens to repel debris with a charge generator having an elastomeric connector having at least one conductive layer stacked on at least one non-conductive layer;
determining a change in transparency of the camera lens;
comparing the change in transparency to a predetermined threshold; and
selectively activating an actuator to vibrate the camera lens if the change in transparency is above the predetermined threshold.

18. The non-transitory computer-readable medium of claim 17, wherein comparing the change in transparency to the predetermined threshold includes:
comparing an amount of ambient light measured by a light sensor to an amount of light that passes through the camera lens; and
determining whether a difference between the amount of ambient light and the amount of light that passes through the camera lens exceeds the predetermined threshold.

* * * * *